Patented June 9, 1931

1,809,030

UNITED STATES PATENT OFFICE

LEON W. GELLER, OF HAMBURG, NEW YORK, ASSIGNOR TO NATIONAL ANILINE & CHEMICAL CO., INC., OF NEW YORK, N. Y., A CORPORATION OF NEW YORK

MONAZO DYES FROM p-CHLORPHENYLPYRAZOLONES AND ANILINES

No Drawing.    Application filed December 23, 1925. Serial No. 77,372.

This invention relates to the manufacture and production of new monazo compounds of the pyrazolone series which are of general value for dyeing wool and other material or for the production of useful lakes and pigments. The product obtained by treating a fabric or other material with one or more of the new compounds, or a lake or pigment thereof, as by dyeing, printing or painting, also forms a part of the present invention.

The new compounds can be obtained by coupling a diazotized aromatic amino compound of the benzene series which is free from a substituent containing a benzene nucleus with a monohalogenated 1-aryl-5-pyrazolone body of the benzene series in which the halogen atom is attached to the 4′-position of the benzene nucleus. Amongst the pyrazolones, the 1-(4′-chlor-2′-sulfophenyl)-5-pyrazolones when coupled with a diazo compound of an aforesaid aromatic amine, and especially when coupled with a diazotized aniline or toluidine body such as, for example, aniline or toluidine or a derivative thereof (e. g., an alkoxy, sulfo-, carboxyl, hydroxy or halogen derivative thereof, etc.) have been found to give particularly good results.

The new compounds correspond with the probable general formula

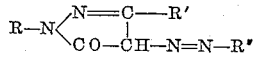

wherein R signifies a monohalogenated aryl radical of the benzene series which contains the halogen atom in the 4′-position of the benzene nucleus, and which may contain other substituents in said nucleus, R′ denotes a methyl or a carboxyl group, and R″ an aryl radical of the benzene series which is free from a substituent containing a benezene nucleus but which may contain other substituents. The new compounds constitute yellow to red to brown powders soluble in concentrated sulfuric acid giving yellow to brown colorations, and are capable of forming lakes or pigments. Those containing an acid group, i. e., a carboxyl or a sulfo group, or both, in the molecule of the compound, and particularly the alkali metal salt thereof, are soluble in hot or boiling water giving yellow to red to brown solutions, and dye wool from an acid bath yellow to red to brown shades or tints. Those not containing a sulfo or carboxyl group are insoluble or difficultly soluble in hot or boiling water. Upon reduction, for example with stannous chloride and hydrochloric acid, the new compounds yield a 1-(4′-halogen-aryl)-4-amino-pyrazolone derivative of the benzene series and an amino body of the benzene series which is free from an exonuclear benzene nucleus.

In producing the new monazo compounds of the present invention, the diazo compound of the aromatic amino body (one molecular proportion) is added to a well stirred solution or suspension of the pyrazolone compound (in slight excess of one molecular proportion (which is maintained at a temperature of about 0° to 15° C., preferably about 0° to 5° C., and rendered and kept alkaline throughout the reaction. When the coupling is complete, the reaction mixture is heated to about 40° to 90° C. and the compound isolated in any suitable manner.

The following specific example will further illustrate the invention, but it is understood that the invention is not limited thereto. The parts are by weight.

*Example*: 230 parts of the sodium salt of 3-chlor-4-aminobenzene-sulfonic acid are dissolved in about 1000 parts water and 250 parts of 20° Bé. hydrochloric acid and diazotized in the usual manner by means of about 70 parts of sodium nitrite. Excess of nitrous acid is to be avoided. The diazo solution thus obtained is carefully added to a vigorously stirred and iced solution of 366 parts of the sodium salt of 1-(4′-chlor-2′-sulfophenyl)-3-carboxy-5-pyrazolone dissolved in about 2500–3000 parts of water containing a sufficient quantity of sodium carbonate to maintain an alkaline reaction throughout the combination. The addition of an excess of diazo solution is to be avoided. When the combination is complete, the reaction mixture is heated to about 50°–60° C., and the dyestuff precipitated by the addition of common salt and isolated in any suitable manner.

The new dyestuff thus obtained is the sodium salt of an acid which corresponds with the following probable formula

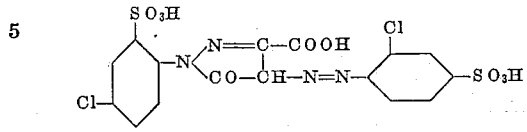

and in the dried and pulverized state in the shape of its sodium salt is a yellowish-brown powder soluble in concentrated sulfuric acid and in water giving greenish-yellow solutions, and dyes wool from an acid bath greenish yellow shades of excellent fastness to light. The neutral aqueous solution of the dyestuff when heated with zinc dust and subsequently exposed to the air produces a blue-red coloration. Upon reduction with stannous chloride and hydrochloric acid, there is formed 4-amino-3-chlorbenzene-sulfonic acid and 1-(4'-chlor-2'-sulfophenyl)-3-carboxy-4-amino-5-pyrazolone.

In a similar manner, dyestuffs which show in general analogous properties may be obtained by coupling on the one hand the same or another 1-(4'-chlorphenyl)-5-pyrazolone such as, for example, 1-(4'-chlorphenyl)-5-pyrazolone, 1-(4'-chlor-3'-sulfophenyl)-5-pyrazolone, 1-(4'-chlor-3'-carboxyphenyl)-5-pyrazolone, 1-(4'-chlor-2'-methylphenyl)-5-pyrazolone, 1-(4'-chlor-2-hydroxyphenyl)-5-pyrazolone, 1-(4'-brom-3'-hydroxyphenyl)-5-pyrazolone, 1-(4'-chlor-3'-methylphenyl)-5-pyrazolone, 1-(4'-chlor-2'-methoxyphenyl)-5-pyrazolone, 1-(4'-chlor-3'-methoxyphenyl)-5-pyrazolone, etc., with the diazo compound on the other hand of the same or another aromatic amino derivative of the benzene series free from a substitutent containing a benzene nucleus such as, for example, aniline, o-, m- or p-toludine, o-, m- or p-nitraniline, o- or p-chloraniline, o-anisidine, 2.5-dichloraniline, sulfanilic acid, metanilic acid, sulfanthranilic acid, anthranilic acid, p-chlor-o-aminobenzoic acid, 2-amino-5-chlorphenol, 3.5-dichlor-2-aminobenzoic acid, 2-aminobenzene-sulfonic acid, 2-chlor-5-aminobenzene-sulfonic acid, 4-chlor-2-aminobenzene-sulfonic acid, 2-chlor-3-aminobenzene-sulfonic acid, 3-chlor-6-aminobenzene-sulfonic acid, 2-methyl-3-aminobenzene-sulfonic acid, 3-methyl-6-aminobenzene-sulfonic acid, 2-methyl-4-aminobenzene-sulfonic acid, 4-methyl-3-aminobenzene-sulfonic acid, 2.5-dichlor-3-aminobenzene-sulfonic acid, 2.5-dichlor-4-aminobenzene-sulfonic acid, aminosalicyclic acid, o-aminophenol or its nitro-, sulfo, carboxy or halogen nuclear derivatives, etc.

In the specification and claims it will be understood that the pyrazolones contemplated in the present invention carry a methyl or a carboxyl group in the 3-position in the pyrazolone nucleus unless otherwise specified, and are capable of combining in the 4-position with diazo compounds.

I claim:

1. As new products, the monazo compounds of the pyrazolone series which correspond with the probable formula

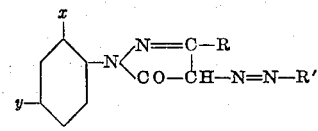

wherein $x$ signifies a hydrogen atom which may be replaced by a sulfo or a carboxyl group, $y$ a halogen atom, R a methyl or a carboxyl group, and R' an aryl radical of the benzene series which is free from a substituent containing a benzene nucleus but which may carry other substituents; said compounds being soluble in concentrated sulfuric acid to give yellow to red to brown colorations; and upon reduction yield a 1-(4'-halogen-phenol)-4-amino-5-pyrazolone which may contain a sulfo or a carboxyl group in the phenyl nucleus and an arylamino body of the benzene series which is free from a substituent containing a benzene nucleus.

2. As new products, the monazo dyestuffs of the pyrazolone series which in the free state correspond with the probable formula

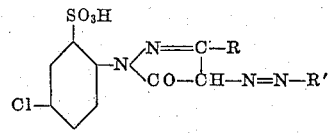

wherein R signifies a methyl or a carboxyl group and R' an aryl radical of the benzene series which is free from a substituent containing a benzene nucleus; said dyestuffs in the form of their sodium salts constituting yellow to red to brown powders which dissolve in concentrated sulfuric acid and in hot water to give yellow to red to brown solutions, and which dye wool from an acid bath yellow to red to brown shades.

3. As new products, the monazo dyestuffs of the pyrazolone series which in the free state correspond with the probable formula

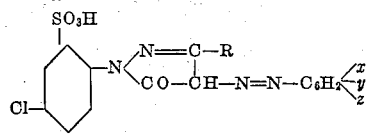

wherein R signifies a methyl or a carboxyl group, $x$ denotes a hydrogen or halogen atom, or an alkyl or alkoxyl or hydroxyl group, $y$ a hydrogen or a halogen atom, or a carboxyl or a sulfo group, and $z$ a hydrogen or chlorine atom; said dyestuffs in the form of their sodium salts being soluble in concentrated sulfuric acid and in hot water, and dye wool in an acid bath yellow to red shades.

4. As new products, the monazo dyestuffs of the pyrazolone series which in the free state correspond with the probable formula

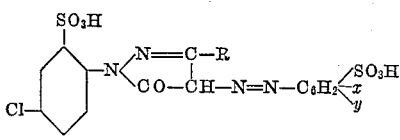

wherein R signifies a methyl or a carboxyl group, $x$ denotes a hydrogen or chlorine atom, or a methyl group, and $y$ a hydrogen or a chlorine atom; said dyestuffs in the shape of their sodium salts being yellow to brown powders soluble in hot water and in concentrated sulfuric acid, and dye wool from an acid bath yellow to red shades.

5. As a new product, the monazo dyestuffs of the pyrazolone series which in the free state corresponds with the probable formula

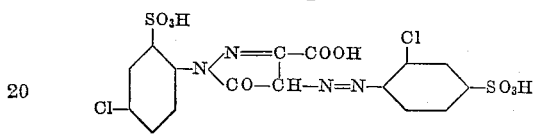

6. The product obtained by treating material with a compound of claim 1.
7. Material dyed with a dyestuff of claim 2.
8. Material dyed with a dyestuff of claim 3.
9. Material dyed with a dyestuff of claim 4.
10. Material dyed with the dyestuff of claim 5.
11. As new products, the monazo dyestuffs of the pyrazolone series which in the free state correspond with the following probable formula

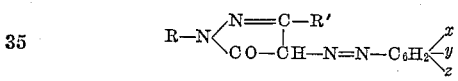

wherein R signifies a monohalogenated aryl nucleus of the benzene series in which the halogen atom is attached to the 4'-position of the benzene nucleus which may carry other substituents, R' denotes a methyl or a carboxyl group, and $x$ represents a hydrogen or halogen atom, or an alkyl or alkoxyl or hydroxyl group, $y$ a hydrogen or a halogen atom, and $z$ a hydrogen or halogen atom, or a carboxyl or a sulfo group.

12. As new products, the monazo dyestuffs of the pyrazolone series which in the free state correspond with the following probable formula

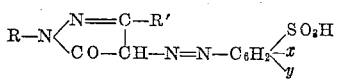

wherein R signifies a monohalogenated aryl nucleus of the benzene series in which the halogen atom is attached to the 4'-position of the benzene nucleus which may carry other substituents, R' denotes a methyl or a carboxyl group, and $x$ represents a hydrogen or a chlorine atom and $y$ a hydrogen or a chlorine atom, or an alkyl, or hydroxyl or alkoxyl or carboxyl group.

13. As new products, the monazo dyestuffs of the pyrazolone series which in the free state correspond with the following probable formula

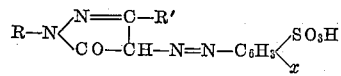

wherein R signifies a monohalogenated aryl nucleus of the benzene series in which the halogen atom is attached to the 4'-position of the benzene nucleus which may carry other substituents, R' denotes a methyl or a carboxyl group, and $x$ represents a hydrogen or a halogen atom, or an alkyl, alkoxyl, hydroxyl or carboxyl group.

14. As new products, the monazo dyestuffs of the pyrazolone series which in the free state correspond with the following probable formula

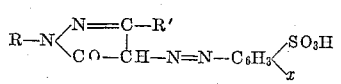

wherein R signifies a monohalogenated aryl nucleus of the benzene series in which the halogen atom is attached to the 4'-position of the benzene nucleus which may carry other substituents, R' denotes a methyl or a carboxyl group, and $x$ represents a halogen atom.

15. As new products, the monazo dyestuffs of the pyrazolone series which in the free state correspond with the following probable formula

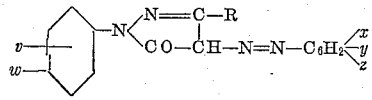

wherein $w$ signifies a halogen atom, $v$ denotes a hydrogen atom or an alkyl, an alkoxyl, a hydroxyl, a carboxyl or a sulfo group, R represents a methyl or a carboxyl group, and $x$ denotes a hydrogen or halogen atom, $y$ a hydrogen or halogen atom, or an alkyl, alkoxyl or hydroxyl group, and $z$ a hydrogen or halogen atom, or a carboxyl or sulfo group.

16. As new products, the monazo dyestuffs of the pyrazolone series which in the free state correspond with the following probable formula

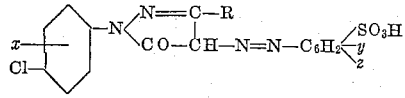

wherein $x$ signifies a hydrogen atom, or an alkyl, an alkoxyl, a hydroxyl, a carboxyl or a sulfo group, R represents a methyl or a carboxyl group, and $y$ denotes a hydrogen or chlorine atom, and $z$ a hydrogen or chlorine atom, or an alkyl, an alkoxyl, a hydroxyl or a carboxyl group.

17. As new products, the monazo dyestuffs of the pyrazolone series which in the free state correspond with the following probable formula

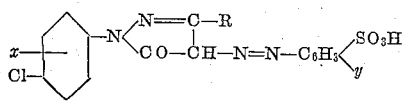

wherein $x$ signifies a hydrogen atom, or an alkyl, an alkoxyl, a hydroxyl, a carboxyl or a sulfo group, R represents a methyl or a carboxyl group, and $y$ denotes a hydrogen or chlorine atom, or an alkyl, an alkoxyl, a hydroxyl or a carboxyl group.

18. As new products, the monazo dyestuffs of the pyrazolone series which in the free state correspond with the following probable formula

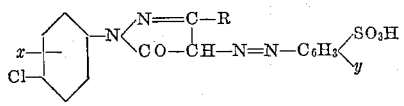

wherein $x$ signifies a hydrogen atom, or an alkyl, an alkoxyl, a hydroxyl, a carboxyl, or a sulfo group, R represents a methyl or a carboxyl group, and $y$ denotes a hydrogen or a halogen atom.

19. As new products, the monazo dyestuffs of the pyrazolone series which in the free state correspond with the following probable formula

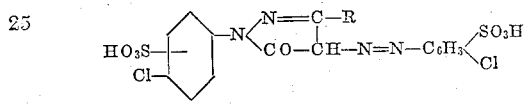

wherein R signifies a methyl or a carboxyl group.

20. As new products, the monazo dyestuffs of the pyrazolone series which in the free state correspond with the following probable formula

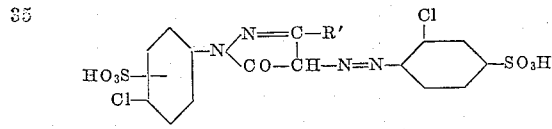

wherein R signifies a methyl or a carboxyl group.

21. As new products, the monazo dyestuffs of the pyrazolone series which in the free state correspond with the following probable formula

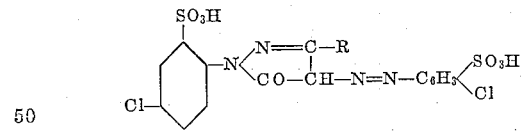

wherein R signifies a methyl or a carboxyl group.

22. Material dyed with a dyestuff of claim 11.
23. Material dyed with a dyestuff of claim 12.
24. Material dyed with a dyestuff of claim 13.
25. Material dyed with a dyestuff of claim 14.
26. Material dyed with a dyestuff of claim 15.
27. Material dyed with a dyestuff of claim 16.
28. Material dyed with a dyestuff of claim 17.
29. Material dyed with a dyestuff of claim 18.
30. Material dyed with a dyestuff of claim 19.
31. Material dyed with a dyestuff of claim 20.
32. Material dyed with a dyestuff of claim 21.

33. As new products, the monazo dyestuffs of the pyrazolone series which in the free state correspond with the probable formula:

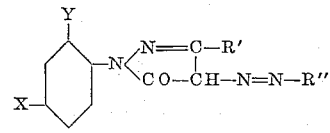

wherein X denotes a halogen atom, Y a monovalent substituent, R′ a methyl or a carboxyl group, and R″ an aryl radical of the benzene series which is free from a substituent containing a benzene nucleus but which may carry other substituents.

34. As new products, the monazo dyestuffs of the pyrazolone series which in the free state correspond with the following probable formula:

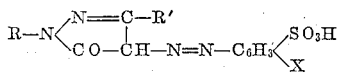

wherein R signifies a monohalogenated aryl nucleus of the benzene series in which the halogen atom is attached to the 4′-position of the benzene nucleus which carries one other substituent, R′ denotes a methyl or a carboxyl group, and X represents a halogen atom.

35. As new products, the monazo dyestuffs of the pyrazolone series which in the free state correspond with the following probable formula:

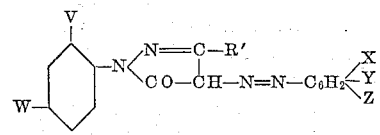

wherein V denotes a monovalent substituent, W signifies a halogen atom, R′ stands for a methyl or a carboxyl group, and X, Y and Z each denote, respectively, a hydrogen atom or a monovalent substituent which is free from a benzene nucleus.

36. Material dyed with the dyestuff of claim 33.
37. Material dyed with the dyestuff of claim 34.
38. Material dyed with the dyestuff of claim 35.

In testimony whereof I affix my signature.

LEON W. GELLER.